US009466010B2

(12) United States Patent
Cao et al.

(10) Patent No.: US 9,466,010 B2
(45) Date of Patent: Oct. 11, 2016

(54) IMAGE SIMILARITY DETERMINING DEVICE AND METHOD, AND AN IMAGE FEATURE ACQUIRING DEVICE AND METHOD

(71) Applicant: FUJITSU LIMITED, Kawasaki-shi, Kanagawa (JP)

(72) Inventors: Qiong Cao, Beijing (CN); Rujie Liu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/304,324

(22) Filed: Jun. 13, 2014

(65) Prior Publication Data
US 2014/0368689 A1 Dec. 18, 2014

(30) Foreign Application Priority Data

Jun. 14, 2013 (CN) .......................... 2013 1 0237721

(51) Int. Cl.
G06K 9/62 (2006.01)
G06K 9/52 (2006.01)

(52) U.S. Cl.
CPC ............... G06K 9/6211 (2013.01); G06K 9/52 (2013.01)

(58) Field of Classification Search
CPC ............ G06K 9/46; G06K 9/52; G06K 9/62; G06K 9/6211; G06T 9/46; G06T 9/52; G06T 9/62; G06T 9/6211

USPC ........... 348/169, 208.1, 222.1; 382/103, 181, 382/190, 192, 199, 201, 203, 205, 219, 220
See application file for complete search history.

(56) References Cited

U.S. PATENT DOCUMENTS

| 8,134,603 B2 * | 3/2012 | Auberger et al. .......... 348/208.3 |
| 8,488,010 B2 * | 7/2013 | Voss et al. ............... 348/208.99 |
| 8,760,513 B2 * | 6/2014 | Strine et al. .................. 348/143 |

* cited by examiner

*Primary Examiner* — Lin Ye
*Assistant Examiner* — Chriss Yoder, III
(74) *Attorney, Agent, or Firm* — Staas & Halsey LLP

(57) ABSTRACT

An image similarity determining device and method and an image feature acquiring device and method are provided. The image similarity determining device comprises a pre-processing unit for extracting feature points of each input image region of an input image and each image region to be matched of a data source image; a matched feature point set determining unit for determining one to one matched feature point pairs between input image regions and image regions to be matched to determine matched feature point sets; a geometry similarity determining unit for determining a geometry similarity between the input image region and the image region to be matched based on distribution of respective feature points in the matched feature point sets; and an image similarity determining unit for determining similarity between input image and data source image based on geometry similarities between input image regions and corresponding image regions to be matched.

11 Claims, 6 Drawing Sheets

IMAGE SIMILARITY DETERMINING DEVICE AND METHOD, AND AN IMAGE FEATURE ACQUIRING DEVICE AND METHOD

CROSS REFERENCE TO RELATED APPLICATIONS

This claims the benefit of Chinese Application No. 201310237721.X, filed Jun. 14, 2013, the disclosure of which is incorporated herein by reference.

FIELD OF THE INVENTION

The present disclosure relates to the field of image processing, and in particular, to a device and method for determining the similarity between images, and a device and method for acquiring image features.

BACKGROUND OF THE INVENTION

In the field of image processing, the image matching (namely, how to determine the similarity between images) is very important in the realization of image content-based retrieval application. The current image matching can be mainly divided into gray-based image matching and feature-based image matching. The features processed by the feature-based image matching typically include color feature, texture feature, etc. However, the accuracy of the current image matching still needs to be improved.

SUMMARY OF THE INVENTION

A brief summary of the present disclosure is given below, so as to provide a basic understanding on some aspects of the present disclosure. It will be appreciated that the summary is not an exhaustive description of the present disclosure. It is not intended to define a key or important part of the present disclosure, nor is it intended to limit the scope of the present disclosure. It aims to give some concepts in a simplified form, as a preface to the more detailed description described later.

In view of above drawbacks of the prior art, an object of the present disclosure is to provide an image similarity determining device and method and an image feature acquiring device and method, to overcome at least the above problems existing in the prior art.

According to an aspect of the present disclosure, there is provided an image similarity determining device for determining similarity of an input image and a data source image, the image similarity determining device comprising: a preprocessing unit configured for dividing the input image into at least one input image region and dividing the data source image into at least one image region to be matched, and extracting feature points of each input image region and each image region to be matched; a matched feature point set determining unit configured for determining, with respect to each input image region, one to one matched feature point pairs between the input image region and each image region to be matched, according to the feature similarities between each feature point of the input image region and each feature point of the corresponding image regions to be matched, and forming a matched feature point set including all the matched feature points for the input image region and its corresponding image regions to be matched according to the one to one matched feature point pairs; a geometry similarity determining unit configured for determining, with respect to each input image region and its corresponding image region to be matched, a geometry similarity between the input image region and the corresponding image region to be matched, based on the distribution of respective feature points in the matched feature point set of the input image region and the distribution of respective feature points in the matched feature point set of the corresponding image region to be matched; and an image similarity determining unit configured for determining the image similarity between each input image region and its corresponding image region to be matched, according to the geometry similarity between the input image region and the corresponding image region to be matched, and determining the similarity between the input image and the data source image according to the image similarities between each of the input image regions of the input image and respective corresponding image regions to be matched.

According to another aspect of the present disclosure, there is provided an image feature acquiring device, comprising: a preprocessing unit configured for preprocessing an input image so as to divide the input image into at least one input image region and extract feature points of each input image region; a feature region constructing unit configured for constructing a feature region with respect to each feature point in a feature point set of each input image region having at least three feature points, wherein the feature region satisfies with the following conditions: the feature point is used as a vertex of the feature region; a ray formed by the vertex and at least one of the other feature points in the feature point set is used as an edge of the feature region, the feature region constructed by two of said edges includes all feature points of the feature point set, and the angle of the feature region is the smallest; and an image feature acquiring unit configured for determining geometric features of the input image region, according to the distribution of respective feature points in each of the feature regions, as a type of image feature of the input image region.

According to still another aspect of the present disclosure, there is provided An image similarity determining method for determining similarity of an input image and a data source image, the image similarity determining method comprising: dividing the input image into at least one input image region and dividing the data source image into at least one image region to be matched, and extracting feature points of each input image region and each image region to be matched; determining, with respect to each input image region, one to one matched feature point pairs between the input image region and each image region to be matched, according to the feature similarities between each feature point of the input image region and each feature point of respective image regions to be matched, and forming a matched feature point set including all the one to one matched feature points for the input image region and its corresponding image regions to be matched according to the one to one matched feature point pairs; determining, with respect to each input image region and its corresponding image region to be matched, a geometry similarity between the input image region and the corresponding image region to be matched, based on the distribution of respective feature points in the matched feature point set of the input image region and the distribution of respective feature points in the matched feature point set of the corresponding image region to be matched; and determining the image similarity between each input image region and its corresponding image region to be matched according to the geometry similarity between the input image region and the corresponding image region to be matched, and determining the similarity between the input image and the data source image according to the image similarities between each of the input image regions of the input region and respective corresponding image regions to be matched.

According to still another aspect of the present disclosure, there is provided an image feature acquiring method, comprising: preprocessing the input image so as to divide the input image into at least one input image region and extract feature points of each input image region, and forming a feature point set including all of the feature points with respect to each of the input images; constructing a feature region with respect to each feature point in a feature point set of each input image region having at least three feature points, wherein the feature region satisfies with the following conditions: the feature point is used as a vertex of the feature region; a ray formed by the vertex and at least one of the other feature point in the feature point set is used as an edge of the feature region, the feature region constructed by two of said edges includes all feature points of the matched feature point set, and the angle of the feature region is the smallest; and determining geometric features of the input image region, according to the distribution of respective feature points in each of the feature region, as a type of image feature of the input image region.

According to still another aspect of the present disclosure, there is provided an electronic apparatus which includes the image similarity determining device or the image feature acquiring device as described above.

According to still another aspect of the present disclosure, there is provided a program by which the computer is used as the image similarity determining device or the image feature acquiring device as described above.

According to still another aspect of the present disclosure, there is provided a corresponding computer-readable storage medium on which the computer program that can be executed by a computing apparatus is stored, when executed, the computer program enables said computing apparatus to perform the image similarity determining method or the image feature acquiring method as described above.

The above mentioned image similarity determining device and method according to embodiments of the present disclosure can at least improve the accuracy of image matching, and the image feature acquiring device and method according to embodiments of the present disclosure can at least provide a new image feature acquiring way for the image matching.

Through the following detailed description of the best mode of the present disclosure in conjunction with the accompanying drawings, these and other advantages of the present disclosure will become more apparent.

BRIEF DESCRIPTION OF THE DRAWINGS

The disclosure may be understood better by referring to description provided in conjunction with the accompanying drawings, wherein the same or similar reference signs are used to represent the same or similar components in all of the figures. The figures and the following detailed description are included in the specification and form a part of the specification, and used to further explain preferred embodiments of the present disclosure and explain principle and object of the present disclosure by examples. Wherein.

Figure 1:
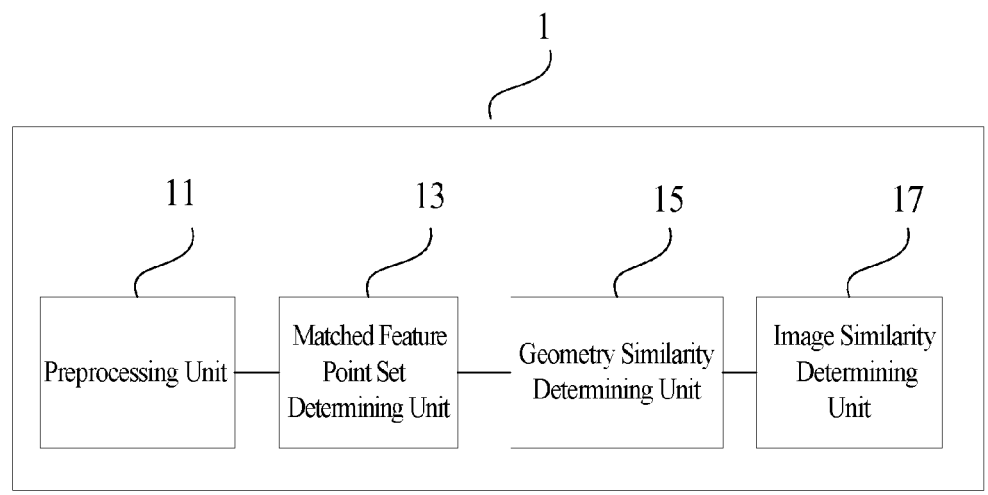
FIG. 1 is a block diagram schematically illustrating an exemplary structure of the image similarity determining device according to an embodiment of the present disclosure.

The skilled person should understand that elements in the figures are illustrated for simplicity and clarity, and are not necessarily drawn to scale. For example, the size of some elements in the accompanying drawings may be enlarged with respect to other elements, so as to facilitate improving the understanding of embodiments of the present disclosure.

DETAILED DESCRIPTION OF THE INVENTION

Exemplary embodiments of the present disclosure are described below in conjunction with the accompanying drawings. For the sake of clarity and conciseness, not all the features of actual implementations are described in the specification. However, it is to be appreciated that during developing any such actual implementations, numerous implementation-specific decisions must be made to achieve the developer's specific goals, for example, compliance with system-related and business-related constraints which will vary from one implementation to another. Moreover, it is also to be appreciated that such a development effort might be very complex and time-consuming, but will nevertheless be a routine task for those skilled in the art having the benefit of this disclosure.

It is further noted that only device structures and/or steps closely relevant to implementation of the present disclosure are illustrated in the drawings while omitting other details less relevant to the present disclosure so as not to obscure the present disclosure due to those unnecessary details.

The image similarity determining device according to embodiments of the present disclosure is used to determine the similarity between the input image and the data source images.

According to embodiments of the present disclosure, for example, the input image may be an image input from a user, an image taken by an electronic apparatus, such as a mobile phone and a camera, or an image acquired from Internet by a user. Further, the data source image may be an image from data sources, such as a variety of special databases, general databases, websites, etc., or an image from a combination of these data sources.

FIG. 1 is a block diagram schematically illustrating an exemplary structure of the image similarity determining device according to an embodiment of the present disclo- As shown in FIG. 1, the image similarity determining device according to an embodiment of the present disclosure includes: a preprocessing unit 11 configured for dividing the input image into at least one input image region and dividing the data source image into at least one image region to be matched, and extracting feature points of each input image region and each image region to be matched; a matched feature point set determining unit 13, configured for determining, with respect to each input image region, one to one matched feature point pairs between the input image region and each of the image regions to be matched, according to the feature similarities between each feature point of the input image region and each feature point of the corresponding image regions to be matched, and forming a matched feature point set including all the matched feature points for the input image region and its corresponding image regions to be matched according to the one to one matched feature point pairs; a geometry similarity determining unit 15 configured for determining, with respect to each input image region and its corresponding image region to be matched, a geometry similarity between the input image region and the corresponding image region to be matched, based on the distribution of respective feature points in the matched feature point set of the input image region and the distribution of respective feature points in the matched feature point set of the corresponding image region to be matched; and an image similarity determining unit 17 configured for determining the image similarity between each input image region and its corresponding image region to be matched, according to the geometry similarity between the input image region and the corresponding image region to be matched, and determining the similarity between the input image and the data source image according to image similarities between each of the input image regions of the input image and respective corresponding image regions to be matched.

As shown in FIG. 1, the preprocessing unit 11 performs dividing process to the input image and respective data source images respectively. For example, according to features of the image, such as gray, edge, texture, structure, etc., the preprocessing unit 11 divides the input image into a plurality of input image regions, and divides each data source image into a plurality of image regions as the image region to be matched. The input image and data source images can be divided by adopting existing image dividing techniques, or by adopting regional detection techniques, for example, the maximum stable external region (MSER) detection operator, which has advantages of high repeatability and high resolution. The above mentioned image dividing methods are well known in the art, will not be discussed in more detail herein.

When respective input image regions and respective regions to be matched of the data source image are obtained, the preprocessing unit 11 extracts feature points for each of the divided image areas. According to embodiments of the present disclosure, for example, the preprocessing unit 11 can obtain location information, scale size, direction information of the feature point by using SIFT (Scale Invariant Feature Transform) detection and extract the feature point of the image region by using SIFT feature vector describing the feature point.

Referring to FIG. 1, when the feature points of each of the image regions including the input image regions and the image regions to be matched were obtained by the preprocessing unit 11, the matched feature point set determining unit 13 determines, with respect to each input image region, the feature similarities between each feature point of the input image region and each feature point of respective image regions to be matched. For example, when m feature points are extracted from an input image region Ra, and n feature points are extracted from an image region to be matched Rb, the feature similarities between each feature point $\{F_i\}_{i=1}^{m}$ feature points of the input image region Ra and each feature point of n feature points of the image region to be matched Rb are determined. According to one embodiment of the present disclosure, the feature similarity between feature points can be determined from the distance between feature points. For example, with respect to a pair of feature points consisted of a feature point in the input image region and a feature point in the image region to be matched, the reciprocal of the Euclidean distance between the feature described vectors of the pair of feature points can be calculated as the feature similarity between the pair of feature points. The specific calculation method for the distance of the feature points are well known in the art, and is not discussed in more detail herein.

The matched feature point set determining unit 13 determines the one to one matched feature point pairs between the input image region and each of the image regions to be matched based on the similarity between feature points, and forming a matched feature point set including all the one to one matched feature points respectively for the input image region and its corresponding image regions to be matched according to the one to one matched featured point pairs.

According to embodiments of the present disclosure, the matched feature point set determining unit 13 is configured to construct a cost matrix based on the feature similarity between respective feature points in the input image region and respective feature points in the corresponding image region to be matched, and determine the one to one matched feature point pairs between the input image region and the corresponding image regions to be matched according to the cost matrix.

Specifically, the cost matrix is constructed by using the distance between the feature point pairs, and the one to one matched feature point pairs between the input image region and the image regions to be matched is determined by using an approach such as Hungarian algorithm and according to the minimum cost principle. According to preferred embodiments of the present disclosure, when the cost matrix is constructed, the distance between the feature point pairs in which the distance between feature points is larger than the first given threshold (namely, the feature point pairs being considered as not matched) can be set to, for example, ∞. And the cost matrix is constructed by using the distance between the feature point pairs in which the distance between feature points is less than the first given threshold (namely, the feature point pairs having a relatively large feature similarity), so that the subsequent calculation performed when the one to one matched feature point pair is determined by using the cost matrix is simplified. According to one embodiment of the present disclosure, the matched feature point set determining unit 13 can find a reasonable set of one to one matched feature point pairs in the remained feature point pairs according to the minimum cost principle and for example, by using the Hungarian algorithm, so as to form a matched feature point set including all one to one matched feature points for the input image region and its corresponding image region to be matched respectively.

It should be noted here that, for a certain input image region, if the distances between each feature point in the input image region and a feature point in a certain image region to be matched are larger than the first given threshold, it can be considered that the input image region and the image region to be matched are not matched, accordingly, there is no need to perform subsequent process of determining the one to one matched feature point pairs for the cost matrix constructed by the distances. Furthermore, in the present disclosure, the image region to be matched corresponding to the input image region refers to the image region to be matched that has one to one matched feature point pairs with the input image region determined by the matched feature point set determining unit 13.

Although it is exemplified above that the cost matrix is constructed from the distance between the feature point pairs formed by the feature point in the input image region and the feature point in the image region to be matched, the present disclosure is not limited thereto. For example, the cost matrix can be constructed by taking the feature similarity between the feature point pairs calculated from the distance between the feature point pairs (such as the reciprocal of the distance between the feature point pairs) as entities, and the one to one matched feature points between the input image region and the image region to be matched can be determined from the cost matrix thus constructed.

Still taking the case in which m feature points are extracted from the input image region $R_a$ and n feature points are extracted from the image region to be matched $R_b$ as an example, for example, it is determined, from the cost matrix constructed from the feature similarity between respective feature point pairs, that there are i one to one matched feature point pairs between the input image region and the image region to be matched (accordingly, the image region to be matched is the one corresponding to the input image region), such as $\{P_j, Q_j\}_{j=1}^{i}$, wherein $P_j$ is the matched feature point in the input image region, and $Q_j$ is the matched feature point in the image region to be matched. Thus, the matched feature point set $P=\{P_1, P_2, \ldots, P_i\}$ including all matched feature points $P_j$ is formed for the input image region Ra and the matched feature point set $Q=\{Q_1, Q_2, \ldots, Q_i\}$ including all matched feature points $Q_j$ is formed for the image region to be matched $R_b$.

When the one to one matched feature point pairs are obtained with respect to the input image region and the image region to be matched so that the matched feature point sets are formed for the input image region and the corresponding image region to be matched, the geometry similarity determining unit 15 determines, with respect to each input image region and its corresponding image region to be matched, the geometry similarity between the input image region and the corresponding image region to be matched, based on the distribution of respective feature points in the matched feature point set of the input image region and the distribution of respective feature points in the matched feature point set of the corresponding image region to be matched.

The present disclosure provides a method for determining the geometry similarity between two regions by using the affine invariant matrix representing the geometry relationship between the matched feature point pairs of the input image region and the image region to be matched.

Figure 2:
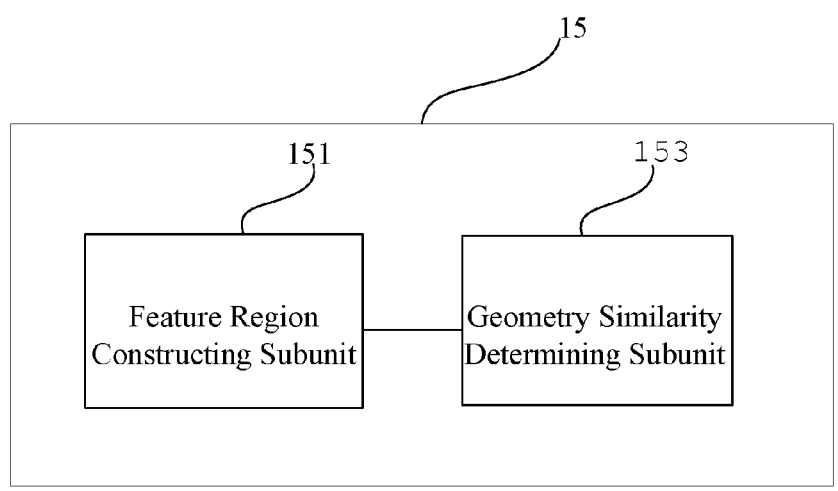
FIG. 2 illustrates a specific implementation of the geometry similarity determining unit shown in FIG. 1.

FIG. 2 illustrates a specific implementation of the geometry similarity determining unit 15 shown in FIG. 1.

As shown in FIG. 2, the geometry similarity determining unit 15 includes: a feature region constructing subunit 151 and a geometry similarity determining subunit 153.

The feature region constructing subunit 151 is configured for respectively constructing, with respect to each input image region having at least three matched feature points included in the matched feature point set and its corresponding image region to be matched, feature regions for each feature point in the matched feature point set of the input image region and each feature point in the matched feature point set of the corresponding image region to be matched, wherein the feature region satisfies with the following conditions: the feature point is used as a vertex of the feature region; a ray formed by the vertex and at least one of the other feature points in the corresponding matched feature point set is used as an edge of the feature region, the feature region constructed by two of said edges includes all feature points of the matched feature point set, and the angle of the feature region is the smallest.

Still taking the case in which the matched feature point set of the input image region $R_a$ is $P=\{P_1, P_2, \ldots, P_i\}$ and the matched feature point set of the corresponding image region to be matched $R_b$ is $Q=\{Q_1, Q_2, \ldots, Q_i\}$ as an example, the operation of the feature region constructing subunit 151 is detailed.

The feature region satisfying the following conditions is searched with respect to each feature point $P_j$ in the matched feature point set $P=\{P_1, P_2, \ldots, P_i\}$ of the input image region $R_a$:

1) the feature point $P_j$ is used as a vertex of the feature region;

2) a ray formed by the vertex and at least one of the other feature points (except for the vertex) in the matched feature point set P constitutes an edge of the feature region;

3) the feature region constructed by two edges satisfying condition 2) include all feature points of the matched feature point set P;

4) the angle of the feature region is the smallest.

Similarly, the feature region satisfying the conditions similar to the above conditions is searched with respect to each feature point $Q_j$ in the matched feature point set $Q=\{Q_1, Q_2, \ldots, Q_i\}$ of the image region to be matched $R_b$.

According to preferred embodiments of the present disclosure, the feature region formed for the input image region and the image region to be matched is a sector region. But the present disclosure is not limited thereto, for example, a triangle region or an open region having and only having the two edges as its edges (namely, the region doesn't have the third edge) etc. is formed based on two edges satisfying condition 2).

Figure 3A:
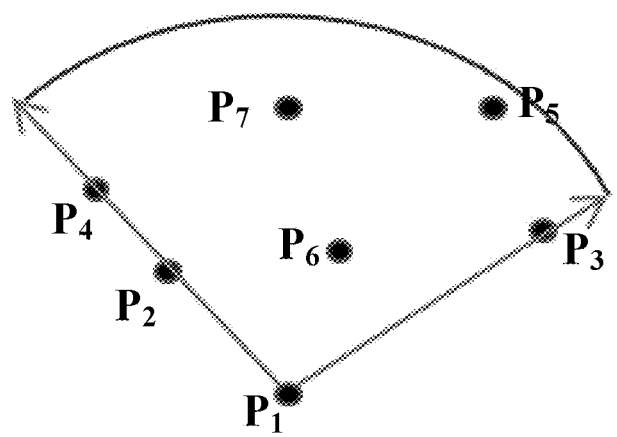
FIGS. 3a and 3b schematically illustrates two examples of the feature region according to an embodiment of the present disclosure.
Figure 3B:
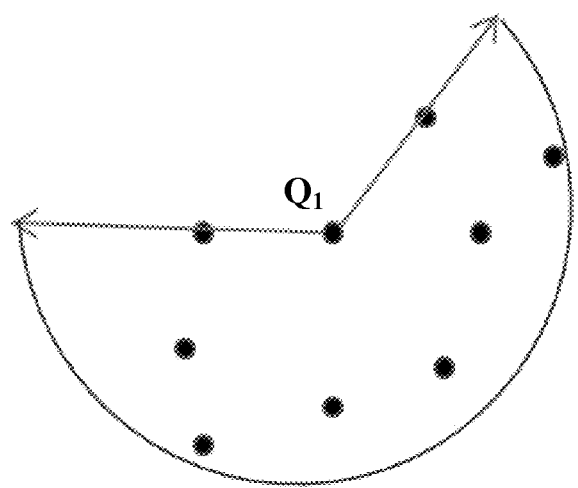

FIGS. 3a and 3b illustrate two examples of the feature region formed according to above conditions.

FIG. 3a shows a sector feature region R constructed with respect to the matched feature point set P having seven matched feature point by taking $P_1$ as a vertex, wherein, the feature points $P_2$, $P_4$ and $P_1$ constitute one edge of the feature region R, feature points $P_3$ and $P_1$ constitute another edge of the feature region R, other feature points $P_5$, $P_6$ and $P_7$ in the matched feature point set P fall in the feature region R. It can be verified that the sector region shown in FIG. 3a is the one satisfying above conditions 1)-4). Similarly, a sector region satisfying above conditions 1)-4) can be constructed with respect to every other feature point in the matched feature point set P by taking the feature point as a vertex.

Similarly, a feature point set can be constructed respectively for each feature point in the matched feature point set Q of the image region to be matched.

It should be noted here that, when the other feature points in the matched feature point set are distributed in a more dispersed manner compared to the feature point as a vertex, the angle of the feature region formed with respect to the feature point may be larger than 180 degrees (see FIG. 3b).

Returning to FIG. 2, when the feature region constructing subunit 151 constructs a feature region for each of matched feature points in the input image region and its corresponding image region to be matched, the geometry similarity determining subunit 153 determines, with respect to each input image region and its corresponding image region to be matched, a geometry similarity between the input image region and the corresponding image region to be matched, based on the distribution of feature points in respective feature regions of the input image region and the distribution of feature points in respective feature regions of the corresponding image region to be matched.

According to the present disclosure, it is proposed that the geometric relation matrix is constructed based on the distribution of matched feature points in respective feature regions of the input image region and the distribution of matched feature points in respective feature regions of the corresponding image region to be matched, and the geometry similarity between the input image region and the image region to be matched is determined according to the distance between geometric relation matrixes.

Figure 4:
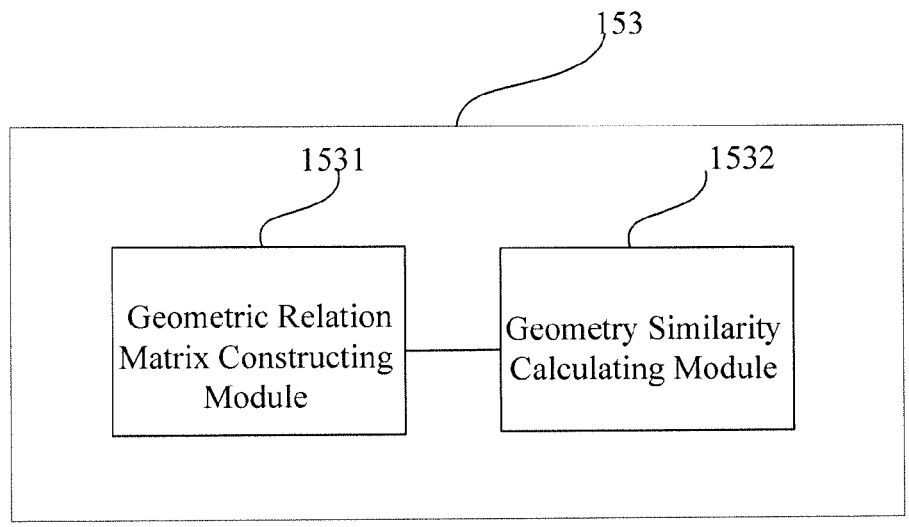
FIG. 4 illustrates a specific implementation of the geometry similarity determining subunit shown in FIG. 2.

FIG. 4 illustrates a specific implementation of the geometry similarity determining subunit 153 shown in FIG. 2.

As shown in FIG. 4, the geometry similarity determining subunit 153 includes: a geometric relation matrix constructing module 1531 and a geometry similarity calculating module 1532.

The geometric relation matrix constructing module 1531 is configured to construct a geometric relation matrix for the input image region and the corresponding image region to be matched respectively, based on the distribution of feature points in respective feature regions of the input image region and the distribution of feature points in respective feature regions of the corresponding image region to be matched.

According to one embodiment of the present disclosure, the geometric relation matrix constructing module 1531 can be configured to construct, with respect to any one of the input image region and its corresponding image region to be matched, the geometric relation matrix for the image region in a way such that each feature point in the matched feature point set of the image region corresponds to a row or a column of the geometric relation matrix, and different values are assigned to each entry in the row vector or column vector of the geometric relation matrix corresponding to the feature point, according to whether respective feature points of the feature point set fall in the feature region constructed for each feature point or fall on the edge of the feature region.

For example, in the case that the input image region $R_a$ and its corresponding image region to be matched have four matched feature point pairs (namely, as to the matched feature point set $P1=\{P_j\}_{j=1}^4$ the input image region $R_a$ and the matched feature point set $Q1=\{Qj\}_{j=1}^4$ of the image region to be matched $R_b$), with respect to the matched feature point set $P_1=\{P_j\}_{j\times 1}^4$ of the input image region $R_a$, the feature point $P_j$ is assigned a value corresponding to the j-th row entry $[h_{j1}, h_{j2}, h_{j3}, h_{j4}]$ of the geometric relation matrix $HP_{4\times 4}$, for example, with respect to the feature region formed by the vertex $P_j$, the first row entries of the geometric relation matrix may be assigned a value according to the following rule:

If the feature point $P_1$ of the matched feature point set P falls on the ray formed by the vertex $P_j$ and other vertex of the matched feature point set (namely, an edge of the feature region), a value of 1 is assigned to $h_{j1}$, otherwise, if the feature point $P_1$ falls in the feature region constructed by the vertex $P_j$, a value of 0 is assigned to $h_{j1}$.

The above method for constructing a geometric relation matrix is just a example, for example, when the feature point falls in the feature region, a value of 1 is assigned to the matrix entry corresponding to the feature point, and when the feature point falls on the edge of the feature region, a value of 0 is assigned to the matrix entry corresponding to the feature point.

With respect to other matched feature points $P_2, P_3, P_4$ in the matched feature point set $P_j$ of the input image region, values are assigned to the j-th row elements $h_{j2}, h_{j3}, h_{j4}$ of the geometric relation matrix $HP_{4\times 4}$ in similar manner, thus, values are assigned to each relation matrix of the geometric relation matrix $HP_{4\times 4}$, so as to complete the construction of the geometric relation matrix of the input image region.

As to the image region to be matched, the geometric relation matrix constructing module 1531 can perform similar operations to the matched feature point set Q of the image region to be matched corresponding to the input image region, so as to construct a geometric relation matrix $HQ_{4\times 4}$ for the corresponding image region to be matched.

For example, the geometric relation matrix $HP_{4\times 4}$ and the geometric relation matrix $HQ_{4\times 4}$ can be respectively constructed as the following matrix based on the above assignment operation:

$$HP_{4\times 4} = \begin{bmatrix} 1 & 1 & 1 & 0 \\ 1 & 1 & 0 & 1 \\ 1 & 0 & 1 & 1 \\ 0 & 1 & 1 & 1 \end{bmatrix}$$

$$HQ_{4\times 4} = \begin{bmatrix} 1 & 1 & 0 & 1 \\ 1 & 1 & 1 & 0 \\ 0 & 1 & 1 & 1 \\ 1 & 0 & 1 & 1 \end{bmatrix}$$

When the geometric relation matrix constructing module 1531 constructs a geometric relation matrix with respect to the input image region and its corresponding image region to be matched, the geometry similarity calculating module 1532 calculates, with respect to each input image region and its corresponding image region to be matched, a distance between the geometric relation matrix of the input image region and the geometric relation matrix of the image region to be matched, as the geometry similarity between the input image region and the corresponding image region to be matched.

According to one embodiment of the present disclosure, the geometry similarity between the input image region and its corresponding image region to be matched can be calculated based on the geometric relation matrices constructed for the two image regions. For example, a XOR operation is performed on the two geometric relation matrices, and the ratio between the XOR operation result and the value of geometric relation matrix of the input image region is taken as the geometry similarity between the input image region and the corresponding image region to be matched.

For example, taking the case that the geometric relation matrix of the input image region is the above mentioned $HP_{4\times 4}$, and the geometric relation matrix of the image region to be matched is the above mentioned $HQ_{4\times 4}$ as an example, the geometry similarity between the input/image region and the corresponding image region to be matched can be calculated as XOR $HP_{4\times 4}, HQ_{4\times 4})/|P|=8/16=0.5$.

According to embodiments of the present disclosure, with respect to each input image region, the geometry similarity between the input image region and its corresponding image region to be matched can be determined for the input image region and the corresponding image region to be matched according to the distribution of feature points in the input image region and the distribution of feature points in the corresponding image region to be matched.

Although the above description of the geometry similarity determining unit 15 just aims at the case of the input image region and one corresponding image region to be matched, it will be appreciated by the skilled person that, in the case that there are a plurality of image regions to be matched corresponding to the input image region, the geometry similarity determining unit 15 calculates the geometry similarity with respect to the input image region and each corresponding image region to be matched. Furthermore, in the case that the input image is divided into a plurality of input image regions, a process similar to that described with respect to above input image region $R_a$ is performed on each input image region.

Returning to FIG. 1, when the geometry similarity determining unit 15 determines the geometry similarity between the input image region and the corresponding image region to be matched with respect to each input image region, the image similarity determining unit 17 determines the image similarity between the input image region and the corresponding image region to be matched according to the geometry similarity between the input image region and the corresponding image region to be matched, and determines the similarity between the input image and the data source image according to the image similarity between each input image region of the input image and respective corresponding image regions to be matched.

According to one embodiment of the present disclosure, the image similarity determining unit 17 can be configured to take the geometry similarity between the input image region and its corresponding image region to be matched as the image similarity between two image regions, and determine the similarity between the input image and the data source image based on the image similarity between the input image region and respective image region to be matched.

According to another embodiment of the present disclosure, the image similarity determining unit 17 can be configured to determine the image similarity between each input image region and its corresponding image region to be matched, according to the weighted combination of geometry similarity and feature similarity between the input image region and the corresponding image region to be matched determined by the geometry similarity determining unit 15. Wherein, the feature similarity between the input image region and the corresponding image region to be matched can be determined from the distance between the one to one matched feature point pairs of the two regions. For example, the feature similarity between the input image region and the corresponding image region to be matched can be determined from the feature similarity between the one to one matched feature point pairs determined when the matched feature point set determining unit 13 determines the matched feature point set. For another example, the image similarity determining unit 17 may determine the feature similarity between each input image region and the corresponding image region to be matched from the feature similarity between feature points of the two image regions determined by the preprocessing unit 11. The specific method for determining the feature similarity is well known in the art, and is not discussed in more detail herein.

Furthermore, according to one embodiment of the present disclosure, the image similarity determining unit 17 is configured to take the corresponding image region to be matched which has the largest image similarity with each input image region of the input image, among a plurality of image region to be matched, as the matched image region matching the input image region, and determine the similarity between the input image and the data source image according to the image similarity between each input image region and the matched image region.

However, the present disclosure is not limited thereto, for example, when the image region to be matched having the largest image similarity with the input image region is obtained, the image similarity determining unit 17 judges the image similarity of the image to be matched, if the largest image similarity is larger than the second given threshold, the image region to be matched is taken as the image region to be matched of the input image region, otherwise, it can be considered that the input image region has no image region to be matched, so that the calculation amount of the image similarity determining unit is reduced.

When the matched image region is obtained, the mean value of the image similarity between respective input image regions and the matched image region thereof may be taken as the image similarity between the input image and the data source image.

When the image similarities between the input image and a plurality of data source images are determined with respect to the input image by using the image similarity determining device according to the present disclosure, for example, the image similarity determining device 1 according to the present disclosure can sort the data source image in descending order based on the determined image similarity, so that the user can obtain the data source image similar to the input image. The present disclosure is particularly suitable for the image content-based retrieval process.

Since the image similarity determining device and method take into account the influence of the spatial distribution of feature points on the image matching, it is possible to improve the accuracy of image matching processing (namely, determining the similarity between images).

According to embodiments of the present disclosure, there is also provided an image feature acquiring device that acquires the distribution of the feature points in an image region as a type of feature of the image.

Figure 5:
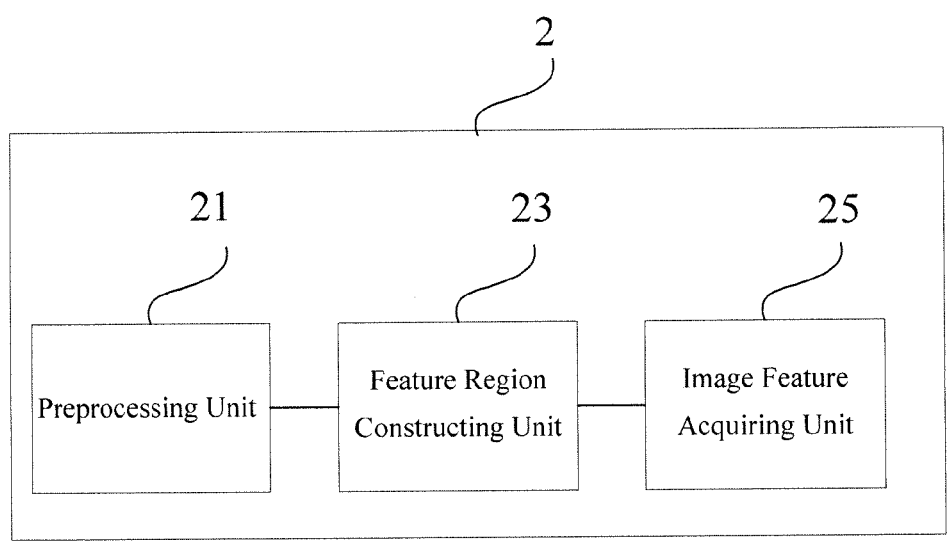
FIG. 5 illustrates an exemplary structure block diagram of the image feature acquiring device according to an embodiment of the present disclosure.

FIG. 5 illustrates an exemplary structure block diagram of the image feature acquiring device according to an embodiment of the present disclosure.

As shown in FIG. 5, the image feature acquiring device 2 includes: a preprocessing unit 21, a feature region constructing unit 23 and an image feature acquiring unit 25.

The preprocessing unit 21 is configured to preprocess the input image so as to divide the input image into at least one input image region and extracting feature points of each input image region. The configuration of the preprocessing unit 21 may be similar to, for example, the preprocessing unit 11 described in conjunction with FIG. 1 in the present disclosure and can perform similar process, and will not be described in detail herein.

The feature region constructing unit 23 is configured to construct a feature region for each feature point in a feature point set of each input image region having at least three feature points, wherein the feature region satisfies with the following conditions: the feature point is used as a vertex of the feature region; a ray formed by the vertex and at least one of the other feature points in the corresponding feature point set is used as an edge of the feature region, the feature region constructed by two of said edges includes all the feature points of the feature point set, and the angle of the feature region is the smallest. The configuration of the feature region constructing unit 23 may be similar to, for example, the feature region constructing subunit 151 described in conjunction with FIGS. 2 and 3 in the present disclosure and can perform similar process, and the detailed description thereof is omitted here.

The image feature acquiring unit 25 is configured to determine geometric features of the input image region, according to the distribution of respective feature points in each of the feature region, as a type of image feature of the input image region. For example, the geometry similarity determined by the geometry similarity determining subunit 151 described in conjunction with FIGS. 2 and 4 can be taken as a type of image feature of the input image region.

According to an embodiment of the present disclosure, there is also provided an image similarity determining method for determining similarity between the input image and the data source image, an exemplary process of the image similarity determining method will be described in conjunction with FIG. 6.

Figure 6:
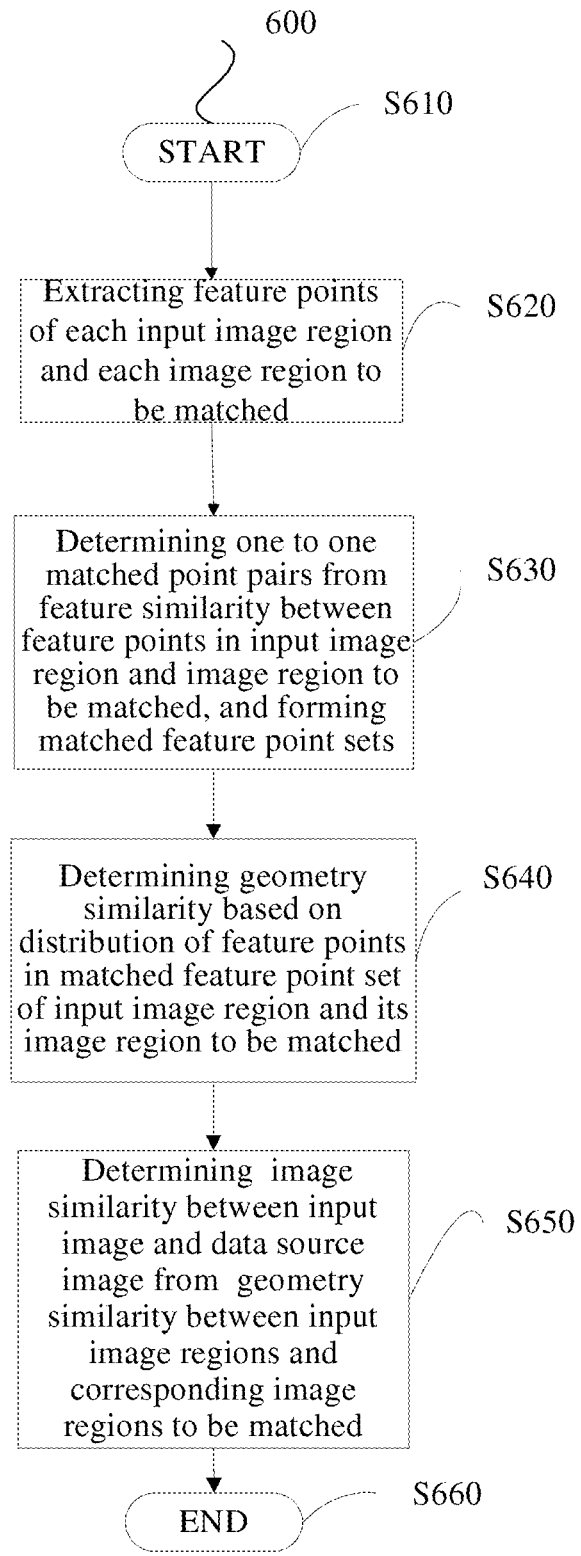
FIG. 6 is a flowchart of an exemplary process of the image similarity determining method according to an embodiment of the present disclosure.

As shown in FIG. 6, the process flow 600 of the image similarity determining method according to an embodiment of the present disclosure begins at S610, and then the process of S620 is performed.

In S620, the input image is divided into at least one input image region and the data source image is divided into at least one image region to be matched, and the feature points of each input image region and each image region to be matched are extracted. For example, S620 is implemented by performing the process of the preprocessing unit 11 described in conjunction with FIG. 1, and the description thereof is omitted here. Then, S630 is performed.

In S630, the one to one matched feature points between the input image region and each of the image regions to be matched are determined according to the feature similarities between each feature point of the input image region and each feature point of respective image regions to be matched, and a matched feature point set including all the matched feature points is formed for the input image region and its corresponding image regions to be matched according to the one to one matched feature points. For example, S630 is implemented by performing the process of the matched feature point set determining unit 13 described in conjunction with FIG. 1, and the description thereof is omitted here. Then, S640 is performed.

In S640, with respect to each input image region and its corresponding image region to be matched, a geometry similarity between the input image region and the corresponding image region to be matched is determined based on the distribution of respective feature points in the matched feature point set of the input image region and the distribution of respective feature points in the matched feature point set of the corresponding image region to be matched. For example, the step of determining the geometry similarity can be implemented by performing the process of the geometry similarity determining unit 15 described in conjunction with FIGS. 2-4, and the description thereof is omitted here.

In S650, the image similarity between each input image region and its corresponding image region to be matched is determined according to the geometry similarity between the input image region and the corresponding image region to be matched, and the image similarity between the input image and the data source image is determined according to the image similarities between each of the input image regions of the input image and respective corresponding image regions to be matched. Then, S660 is performed. For example, S650 is implemented by performing the process of the image similarity determining unit 17 described in conjunction with FIG. 1, and the description thereof is omitted here.

According to an embodiment of the present disclosure, in S650, the image similarity between each input image region and its corresponding image region to be matched can be determined according to the weighted combination of geometry similarity and feature similarity between each input image region and its corresponding image region to be matched; and the image similarity between the input image and the data source image is determined by using the image similarities between the input image regions and the image regions to be matched, determined from the geometry similarity and the feature similarity.

The process flow 600 ends at S660.

Corresponding to the image feature acquiring device according to embodiments of the present disclosure, the present disclosure further provides an image feature acquiring method, an exemplary process of the image feature acquiring method will be described in conjunction with FIG. 7.

Figure 7:
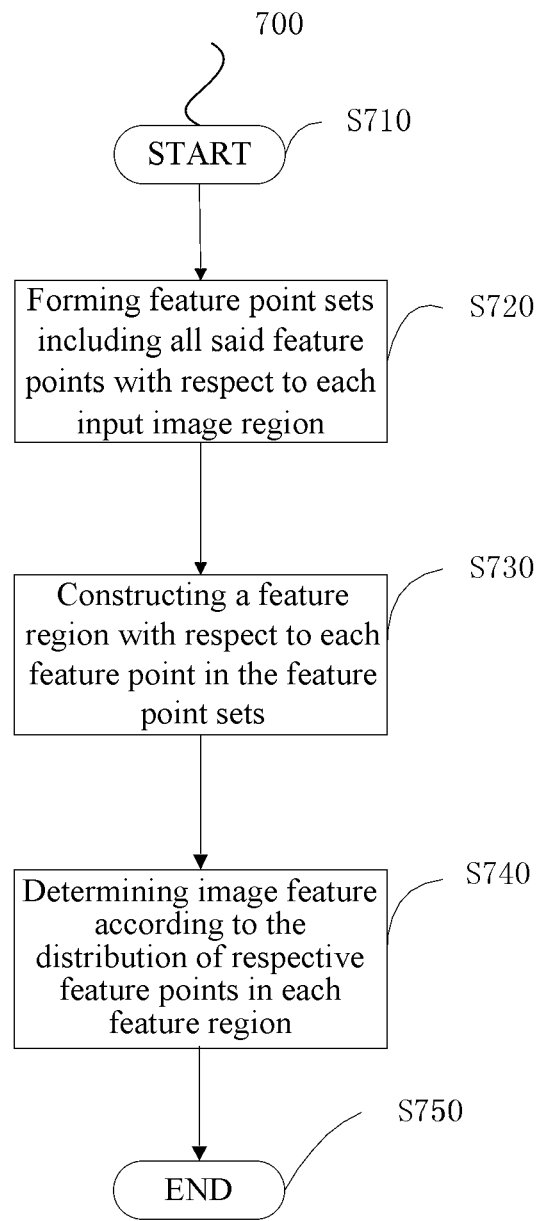
FIG. 7 is a flowchart of an exemplary process of the image feature acquiring method according to an embodiment of the present disclosure.

As shown in FIG. 7, the process flow 700 of the image feature acquiring method according to embodiments of the present disclosure begins at S710, and then the process of S720 is performed.

In S720, the input image is preprocessed so as to divide the input image into at least one input image region and extracting feature points of each input image region, and the feature point set including all feature points is formed with respect to each input image region. For example, S720 is implemented by performing the process of the preprocessing unit 21 described in conjunction with FIG. 5, and the description thereof is omitted here. Then, S730 is performed.

In S730, a feature region is constructed for each feature point in a feature point set having at least three feature points, wherein the feature region satisfies with the following conditions: the feature point is used as a vertex of the feature region; a ray formed by the vertex and at least one of the other feature point in the corresponding feature point set is used as an edge of the feature region, the feature region constructed by two of said edges include all the feature points of the feature point set, and the angle of the feature region is the smallest. For example, S730 is implemented by performing the process of the feature region constructing unit 23 described in conjunction with FIG. 5, and the description thereof is omitted here. Then, S740 is performed.

In S740, the geometric feature of the input image region is determined as a type of image feature of the input image region according to the distribution of respective feature points in each of the feature point region. For example, S740 is implemented by performing the process of the image feature acquiring unit 25 described in conjunction with FIG. 5, and the description thereof is omitted here. Then, S750 is performed.

The process flow 700 ends at S750.

Compared with the prior art, there is provided (namely, the geometry feature for representing the distribution of the feature points) a device and method for acquiring a new image feature according to embodiments of the present disclosure, so that the accuracy of image matching can be improved by using the new image feature in image matching, for example (or, by using the combination of the new image feature and the traditional image feature for image matching). Further, the image similarity determining device and method according to the present disclosure can improve the accuracy of image matching.

In addition, the embodiments of the present disclosure provide an electronic apparatus, the electronic apparatus is configured to include the image similarity determining device 1 or the image feature acquiring device 2 described above. For example, the electronic apparatus may be any of the following devices: a mobile phone, a computer, a tablet, and a personal digital assistant etc. The electronic apparatus including the image similarity determining device 1 or the image feature acquiring device 2 described above may be used for image searching based on image content, for example. Correspondingly, the electronic apparatus can have the beneficial effects and advantages as the image similarity determining device or the image feature acquiring device described above.

Respective component units, subunits in the above mentioned image similarity determining device according to embodiments of the present disclosure can be configured by way of software, firmware, hardware, or any of combinations thereof. In the case of software or firmware implementation, programs constituting the software or firmware are installed to a machine with a dedicated hardware structure from a storage medium or a network, wherein the machine can execute various corresponding functions of the component units, subunits when being installed various programs.

Figure 8:
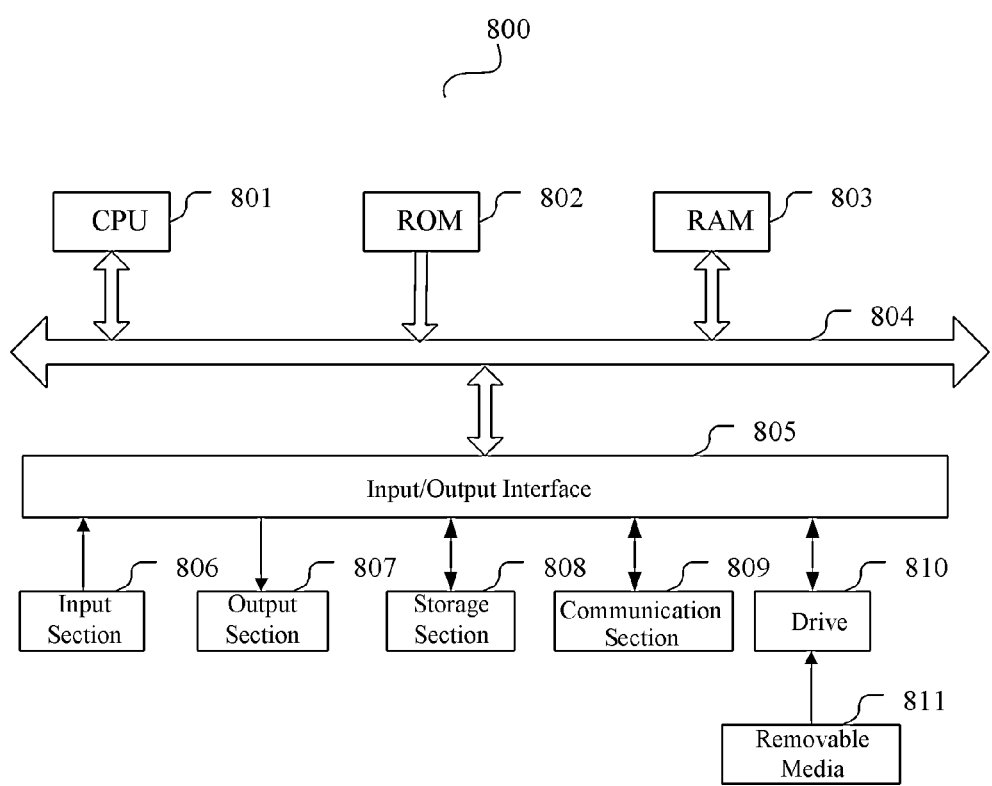
FIG. 8 shows a structure view of hardware configuration of a possible information processing apparatus used to implement an image similarity determining device and method and an image feature acquiring device and method according to an embodiment of the present disclosure.

FIG. 8 shows a structure view of hardware configuration of a possible information processing apparatus used to implement an image similarity determining device and method and an image feature acquiring device and method according to an embodiment of the present disclosure.

In FIG. 8, a central processing unit (CPU) 801 executes various processes according to programs stored in a read only memory (ROM) 802 or programs loaded from the storage section 808 to the random access memory (RAM) 803. In RAM 803, the data required when CPU 801 executes various processes is stored as necessary. CPU 801, ROM 802 and RAM 803 are connected to each other via a bus 804. Input/output interface 805 is also connected to the bus 804.

The following components are also connected to the input/output interface 805: an input section 806 (including a keyboard, mouse, etc.), the output section 807 (including a display, such as a cathode ray tube (CRT), liquid crystal display (LCD), etc. and a speaker, etc.), a storage section 808 (including hard disk, etc.), the communication section 809 (including a network interface card such as a LAN card, modem, etc.). The communication section 809 performs a communication process via a network such as the Internet. If necessary, the drive 810 can be connected to the input/output interface 805. Removable media 811 such as a magnetic disk, optical disk, magneto-optical disk, a semiconductor memory or the like may be mounted on the drive 810 as required, such that a computer program read out therefrom may be installed into the storage section 808 as required.

In case of realizing the above described series of processing by software, a program constituting the software is installed from a network such as the Internet or from a storage medium such as a removable medium 811.

Those skilled in the art should understand that, the storage medium is not limited to the removable storage medium 811 shown in FIG. 8 that stores programs therein and is distributed in a separated form with the apparatus to provide a program to a user. Examples of the removable storage medium 811 include a magnetic disk (including a floppy disk), an optical disc (including a compact disc read-only memory (CD-ROM) and a digital versatile disk (DVD)), a magneto-optical disk (including a mini disk (MD) (Registration trademarks) and a semiconductor memory. Or, the storage medium may be ROM 802, a hard disk contained in the storage section 808, etc., which have programs stored therein and are distributed to the user together with the apparatus including them.

The present disclosure also provides a program product in which machine readable instruction codes are stored. The image similarity acquiring device and method according to embodiments of the present disclosure can be executed when the instruction code is read and executed by the machine. Accordingly, various storage medium such as a magnetic disk, optical disk, magneto-optical disk, a semiconductor memory for carrying such a program product is also included in the present disclosure.

In the above description of the specific embodiments of the present disclosure, features that are described and/or illustrated with respect to one embodiment may be used in the same way or in a similar way in one or more other embodiments and/or in combination with or instead of the features of the other embodiments.

Furthermore, the methods according to the present disclosure shall not be limited to being performed only in the chronological sequence described in the specification but can also be performed in another chronological sequence, concurrently or separately. Therefore, the technical scope of the present disclosure will not be limited by the sequence in which the methods are performed as described in the specification.

Additionally, it is obvious that each operational process of the aforementioned method according to the present disclosure can also be realized in the form of a computer-executable program stored in various machine-readable storage media.

In addition, the objects of the present invention can also be achieved by the way specified below: directly or indirectly supplying the storage medium storing the aforementioned executable program code to a system or an apparatus, and reading and executing the program code by a computer or a central processing unit (CPU) in the system or apparatus.

In this case, as long as the system or the apparatus possesses the function to execute programs, embodiments of the present disclosure are not restricted to the program, and the program may also assume any form, such as target program, interpreter-executed program, or script program supplied to an operating system, etc.

The aforementioned machine-readable storage media include, but are not limited to, various memories and storage units, semiconductor apparatus, magnetic units such as optical, magnetic and magneto-optical disks, as well as other media adapted to storing information.

Moreover, embodiments of the present disclosure can also be realized by connecting a customer information processing terminal to corresponding websites of the Internet, downloading and installing the computer program code according to the present disclosure into the information processing terminal, and executing the program.

In summary, in embodiments according to the present disclosure, the present disclosure provides the following aspects, but not limited thereto:

Aspect 1. An image similarity determining device for determining similarity between an input image and a data source image, the image similarity determining device comprising:

a preprocessing unit configured for dividing the input image into at least one input image region and dividing the data source image into at least one image region to be matched, and extracting feature points of each input image region and each image region to be matched;

a matched feature point set determining unit configured for determining, with respect to each input image region, one to one matched feature point pairs between the input image region and each image region to be matched, according to the feature similarities between each feature point of the input image region and each feature point of the corresponding image regions to be matched, and forming a matched feature point set including all the matched feature points for the input image region and its corresponding image regions to be matched according to the one to one matched feature point pairs;

a geometry similarity determining unit configured for determining, with respect to each input image region and its corresponding image region to be matched, a geometry similarity between the input image region and the corresponding image region to be matched, based on the distribution of respective feature points in the matched feature point set of the input image region and the distribution of respective feature points in the matched feature point set of the corresponding image region to be matched; and an image similarity determining unit configured for determining the image similarity between each input image region and its corresponding image region to be matched, according to the geometry similarity between the input image region and the corresponding image region to be matched, and determining the similarity between the input image and the data source image according to the image similarities between each of the input image regions of the input image and respective corresponding image regions to be matched.

Aspect 2. The image similarity determining device according to aspect 1, wherein the image similarity determining unit is configured for determining the image similarity between each input image region and its corresponding image region to be matched, according to the weighted combination of geometry similarity and feature similarity between the input image region and the corresponding image region to be matched.

Aspect 3. The image similarity determining device according to aspect 1 or 2, wherein the geometry similarity determining unit comprises:

a feature region constructing subunit configured for respectively constructing, with respect to each input image region having at least three matched feature points included in the matched feature point set and its corresponding image region to be matched, feature regions for each feature point in the matched feature point set of the input image region and each feature point in the matched feature point set of the corresponding image region to be matched, wherein the feature region satisfies with the following conditions: the feature point is used as a vertex of the feature region; a ray formed by the vertex and at least one of the other feature points in the corresponding matched feature point set is used as an edge of the feature region, the feature region constructed by two of said edges includes all feature points of the matched feature point set, and the angle of the feature region is the smallest;

a geometry similarity determining subunit configured for determining, with respect to each input image region and its corresponding image region to be matched, a geometry similarity between the input image region and the corresponding image region to be matched, based on the distribution of feature points in respective feature regions of the input image region and the distribution of feature points in respective feature regions of the corresponding image region to be matched.

Aspect 4. The image similarity determining device according to aspect 3, wherein the feature region is a sector region.

Aspect 5. The image similarity determining device according to aspect 3 or 4, wherein the geometry similarity determining subunit further comprises:

a geometric relation matrix constructing module configured for constructing a geometric relation matrix for the input image region and the corresponding image region to be matched respectively, based on the distribution of feature points in respective feature regions of the input image region and the distribution of feature points in respective feature regions of the corresponding image region to be matched; and a geometry similarity calculating module configured for calculating, with respect to each input image region and its corresponding image region to be matched, a distance between the geometric relation matrix of the input image region and the geometric relation matrix of the image region to be matched, as the geometry similarity between the input image region and the corresponding image region to be matched.

Aspect 6. The image similarity determining device according to aspect 5, wherein, the geometric relation matrix constructing module is configured for constructing, with respect to any of the input image region and its corresponding image region to be matched, the geometric relation matrix for the image region in a way such that each feature point in the matched feature point set of the image region corresponds to a row or a column of the geometric relation matrix, and different values are assigned to each element in the row vector or column vector of the geometric relation matrix corresponding to the feature point according to whether respective feature point of the feature point set falls within the feature region constructed for each feature point or fall on the edge of the feature region.

Aspect 7. The image similarity determining device according to any of aspects 1-6, wherein the image similarity determining unit is configured for taking the corresponding image region to be matched which has the largest similarity with each of the input image regions of the input image as a matched image region of the input image region, and determining the similarity between the input image and the data source image according to the image similarities between each input image region and the matched image region thereof.

Aspect 8. The image similarity determining device according to any of aspects 1-6, the matched feature point set determining unit is configured to construct a cost matrix based on the feature similarity between respective feature points in the input image region and respective feature points in the corresponding image region to be matched, and determine the one to one matched feature points between the input image region and the corresponding image regions to be matched according to the cost matrix.

Aspect 9. An image feature acquiring device, comprising:

a preprocessing unit configured for preprocessing an input image so as to divide the input image into at least one input image region and extract feature points of each input image region;

a feature region constructing unit configured for constructing a feature region with respect to each feature point in a feature point set of each input image region having at least three feature points, wherein the feature region satisfies with the following conditions: the feature point is used as a vertex of the feature region; a ray formed by the vertex and at least one of the other feature points in the feature point set is used as an edge of the feature region, the feature region constructed by two of said edges includes all feature points of the feature point set, and the angle of the feature region is the smallest; and an image feature acquiring unit configured for determining geometric features of the input image region, according to the distribution of respective feature points in each of the feature regions, as a type of image feature of the input image region.

Aspect 10. The image similarity determining device according to aspect 9, wherein the feature region is a sector region.

Aspect 11. An image similarity determining method for determining similarity of an input image and a data source image, the image similarity determining method comprising:

dividing the input image into at least one input image region and dividing the data source image into at least one image region to be matched, and extracting feature points of each input image region and each image region to be matched;

determining, with respect to each input image region, one to one matched feature point pairs between the input image region and each image region to be matched, according to the feature similarities between each feature point of the input image region and each feature point of respective image regions to be matched, and forming a matched feature point set including all the one to one matched feature points for the input image region and its corresponding image regions to be matched according to the one to one matched feature point pairs;

determining, with respect to each input image region and its corresponding image region to be matched, a geometry similarity between the input image region and the corresponding image region to be matched, based on the distribution of respective feature points in the matched feature point set of the input image region and the distribution of respective feature points in the matched feature point set of the corresponding image region to be matched; and determining the image similarity between each input image region and its corresponding image region to be matched according to the geometry similarity between the input image region and the corresponding image region to be matched, and determining the similarity between the input image and the data source image according to the image similarities between each of the input image regions of the input region and respective corresponding image regions to be matched.

Aspect 12. An image feature acquiring method, comprising:

preprocessing the input image so as to divide the input image into at least one input image region and extract feature points of each input image region, and forming a feature point set including all of the feature points with respect to each of the input images;

constructing a feature region with respect to each feature point in a feature point set of each input image region having at least three feature points, wherein the feature region satisfies with the following conditions: the feature point is used as a vertex of the feature region; a ray formed by the vertex and at least one of the other feature point in the feature point set is used as an edge of the feature region, the feature region constructed by two of said edges includes all feature points of the matched feature point set, and the angle of the feature region is the smallest; and determining geometric features of the input image region, according to the distribution of respective feature points in each of the feature region, as a type of image feature of the input image region.

Aspect 13. An electric apparatus, including the image similarity determining device according to any of aspects 1-8 or the image feature acquiring device according to aspect 9 or 10.

Aspect 14. The electric apparatus according to aspect 13, wherein the electric apparatus is a mobile phone, computer, tablet, or personal digital assistant.

Aspect 15. A program by which a computer is used as the image similarity determining device according to any of aspects 1-8 or the image feature acquiring device according to aspect 9 or 10.

Aspect 16. A computer-readable storage medium on which the computer program that can be executed by a computing apparatus is stored, when executed, the computer program enable said computing apparatus to perform the image similarity determining method according to aspect 11 or the image feature acquiring method according to aspect 12.

Finally, as should be further explained, such relational terms as left and right, first and second, etc., when used in the present disclosure, are merely used to differentiate one entity or operation from another entity or operation, without necessarily requiring or suggesting that these entities or operations have therebetween any such actual relation or sequence. Moreover, terms 'comprise', 'include' or other variants and any variants thereof are meant to cover non-exclusive inclusion, so that processes, methods, objects or devices that include a series of elements not only include these elements, but also include other elements not explicitly listed, or further include elements inherent in the processes, methods, objects or devices. Without more restrictions, an element defined by the sentence 'including a . . . ' does not preclude the further inclusion of other identical elements in the processes, methods, objects or devices that include this element.

Although the present disclosure has been disclosed above by the description of specific embodiments of the present disclosure, it will be appreciated that those skilled in the art can design various modifications, improvements and equivalents of the present disclosure within the spirit and scope of appended claims. Such modifications, improvements and equivalents should also be regarded as being covered by the protection scope of the present disclosure.

The invention claimed is:

1. An image similarity determining device for determining similarity between an input image and a data source image, the image similarity determining device comprising:
    a memory to store instructions; and
    a processor configured to execute the stored instructions to perform an operation, the operation including:
        dividing the input image into at least one input image region and dividing the data source image into at least one image region to be matched, and extracting feature points of each input image region and each image region to be matched;
        determining, with respect to each input image region, one to one matched feature point pairs between the input image region and each image region to be matched, according to feature similarities between each feature point of the input image region and each feature point of respective image regions to be matched, and forming a matched feature point set including all the matched feature points for the input image region and corresponding image regions to be matched according to the one to one matched feature point pairs;

determining, with respect to each input image region and a corresponding image region to be matched, a geometry similarity between the input image region and the corresponding image region to be matched, based on the distribution of respective feature points in the matched feature point set of the input image region and the distribution of respective feature points in the matched feature point set of the corresponding image region to be matched; and determining the image similarity between each input image region and a corresponding image region to be matched, according to the geometry similarity between the input image region and the corresponding image region to be matched, and determining the similarity between the input image and the data source image according to the image similarities between each of the input image regions of the input image region and respective corresponding image regions to be matched.

2. The image similarity determining device according to claim 1, wherein the determining of the image similarity includes:

determining the image similarity between each input image region and a corresponding image region to be matched, according to a weighted combination of geometry similarity and feature similarity between the input image region and the corresponding image region to be matched.

3. The image similarity determining device according to claim 1, wherein the determining of the geometry similarity includes:

constructing, respectively, with respect to each input image region having at least three matched feature points included in the matched feature point set and a corresponding image region to be matched, feature regions for each feature point in the matched feature point set of the input image region and each feature point in the matched feature point set of the corresponding image region to be matched, the feature region satisfying the following conditions: the feature point is used as a vertex of the feature region; a ray formed by the vertex and at least one of the other feature points in the corresponding matched feature point set is used as an edge of the feature region, the feature region constructed by two of said edges includes all feature points of the matched feature point set, and the angle of the feature region is the smallest, determining, with respect to each input image region and a corresponding image region to be matched, a geometry similarity between the input image region and the corresponding image region to be matched, based on the distribution of feature points in respective feature regions of the input image region and the distribution of feature points in respective feature regions of the corresponding image region to be matched.

4. The image similarity determining device according to claim 3, wherein the feature region is a sector region.

5. The image similarity determining device according to claim 3, wherein the determining of the geometry similarity includes:

constructing a geometric relation matrix for the input image region and the corresponding image region to be matched respectively, based on the distribution of feature points in respective feature regions of the input image region and the distribution of feature points in respective feature regions of the corresponding image region to be matched; and calculating, with respect to each input image region and a corresponding image region to be matched, a distance between the geometric relation matrix of the input image region and the geometric relation matrix of the image region to be matched, as the geometry similarity between the input image region and the corresponding image region to be matched.

6. The image similarity determining device according to claim 5, wherein, the constructing of the geometric relation matrix includes:

constructing, with respect to any of the input image region and a corresponding image region to be matched, the geometric relation matrix for the image region in a way such that each feature point in the matched feature point set of the image region corresponds to a row or a column of the geometric relation matrix, and different values are assigned to each element in the row vector or column vector of the geometric relation matrix corresponding to the feature point according to whether respective feature point of the feature point set falls within the feature region constructed for each feature point or fall on the edge of the feature region.

7. The image similarity determining device according to claim 1, wherein the determining of the image similarity includes:

taking the corresponding image region to be matched which has the largest similarity with each of the input image regions of the input image as a matched image region of the input image region, and determining the similarity between the input image and the data source image according to the image similarities between each input image region and the matched image region thereof.

8. The image similarity determining device according to claim 1, wherein, the determining of the matched feature point set includes constructing a cost matrix based on the feature similarity between respective feature points in the input image region and respective feature points in the corresponding image region to be matched, and determining the one to one matched feature point pairs between the input image region and the corresponding image regions to be matched according to the cost matrix.

9. An image feature acquiring device, comprising:
a memory to store instructions; and
a processor configured to execute the stored instructions to perform an operation, the operation including:
preprocessing an input image so as to divide the input image into at least one input image region and extract feature points of each input image region;
constructing a feature region with respect to each feature point in a feature point set of each input image region having at least three feature points, the feature region satisfying the following conditions: the feature point is used as a vertex of the feature region, a ray formed by the vertex and at least one of the other feature points in the feature point set is used as an edge of the feature region, the feature region constructed by two edges include all feature points of the feature point set, and an angle of the feature region is the smallest, and
determining geometric features of the input image region, according to the distribution of respective feature points in each of the feature regions, as a type of image feature of the input image region.

10. The image feature acquiring device according to claim 9, wherein the feature region is a sector region.

11. An image similarity determining method for determining similarity between an input image and a data source image for use in image searching, the image similarity determining method comprising:

dividing the input image into at least one input image region and dividing the data source image into at least one image region to be matched, and extracting feature points of each input image region and each image region to be matched;

determining, with respect to each input image region, one to one matched feature point pairs between the input image region and each image region to be matched, according to feature similarities between each feature point of the input image region and each feature point of respective image regions to be matched, and forming a matched feature point set including all the one to one matched feature points for the input image region and corresponding image regions to be matched according to the one to one matched feature point pairs;

determining, with respect to each input image region and a corresponding image region to be matched, a geometry similarity between the input image region and the corresponding image region to be matched, based on the distribution of respective feature points in the matched feature point set of the input image region and the distribution of respective feature points in the matched feature point set of the corresponding image region to be matched;

determining the image similarity between each input image region and a corresponding image region to be matched according to the geometry similarity between the input image region and the corresponding image region to be matched; and determining the image similarity between the input image and the data source image according to the image similarities between each of the input image regions of the input region and respective corresponding image regions to be matched, and sorting the data source image in an order based on the determined image similarity for use in the image searching.

* * * * *